US006164481A

United States Patent [19]

Geeham

[11] Patent Number: 6,164,481

[45] Date of Patent: Dec. 26, 2000

[54] PAINT ROLLER SPIN SPRAY SHIELD FOR BUCKETS

[76] Inventor: Timothy E. Geeham, 726 Flowerdale, Ferndale, Mich. 48220

[21] Appl. No.: 08/648,598

[22] Filed: May 16, 1996

Related U.S. Application Data

[62] Division of application No. 08/559,193, Nov. 13, 1995.

[51] Int. Cl.$^{7}$ .............................. B65D 15/02; F16L 21/00

[52] U.S. Cl. .......................... 220/321; 220/4.03; 285/236; 285/383; 285/373

[58] Field of Search ..................................... 220/320, 321; 285/236, 383, 373

[56] References Cited

U.S. PATENT DOCUMENTS

| | | | |
|---|---|---|---|
| D. 308,430 | 6/1990 | O'Shea . | |
| 775,172 | 11/1904 | Hunt . | |
| 1,017,265 | 2/1912 | McRae et al. . | |
| 1,020,347 | 3/1912 | Follett | 220/8 |
| 1,290,041 | 1/1919 | Anderson . | |
| 1,296,742 | 3/1919 | Belvington | 220/8 |
| 1,482,049 | 1/1924 | Swanson | 220/321 |
| 1,901,699 | 3/1933 | Burpee | 220/321 |
| 2,081,877 | 5/1937 | Shanor | 220/320 |
| 2,482,558 | 9/1949 | Scaringella . | |
| 2,595,059 | 4/1952 | Deming | 220/4.03 |
| 2,804,095 | 8/1957 | Schauenburg . | |
| 3,207,483 | 9/1965 | Ranson | 220/8 |
| 3,246,793 | 4/1966 | Wade | 220/321 |
| 3,447,825 | 6/1969 | Santoni | 220/320 |
| 3,837,091 | 9/1974 | Meyer . | |
| 4,036,513 | 7/1977 | Loftus et al. . | |
| 4,083,466 | 4/1978 | McManaway | 220/4.03 |
| 4,135,657 | 1/1979 | Benson et al. | 220/321 |
| 4,172,607 | 10/1979 | Norton . | |
| 4,478,345 | 10/1984 | Edinger | 220/320 |
| 4,646,931 | 3/1987 | Andrews et al. | 220/320 |
| 5,129,537 | 7/1992 | Bordner et al. | 220/321 |
| 5,301,826 | 4/1994 | Sandahl | 220/4.03 |
| 5,411,162 | 5/1995 | Koziczkowski et al. | 220/321 |

OTHER PUBLICATIONS

"Insulated Buckets & Storage Containers" and "Parts Accessories" Information Sheets of Frabill, Inc. Allentown, WI 53002 dated at least as early as Dec. 1994 believed dated before Jul. 1994.

"MinuteMan Portable Ice Fishing Shelters" Brochure of Shappell Corp., Lansing, MI 48906, dated at least as early as Dec. 1994, believed dated before Jul. 1994.

Screw and Serrations Actuated Hose Clamp Product, Generally Commercially Available for many years.

Lockable draw catch product No. V1843 of National Mfg Co., Sterling, IL 61081, dated 1995.

"Outsider" (TM) product of Portable Products, Inc., St. Paul, MN 55107, dated 1994.

*Primary Examiner*—Joseph M. Moy
*Attorney, Agent, or Firm*—Peter D. Keefe

[57] ABSTRACT

A spin spray shield connected with a bucket to thereby assist the bucket to retain centrifugal paint spray when a roller is cleaned with a spinning tool, without detracting from the funtionality of the bucket for other purposes. The spin spray shield generally includes an annular shield member for being selectively located selectively substantially entirely above the mouth of a bucket to thereby serve as a shield for retaining spin generated paint spray within the confines of the interior of the bucket, and further includes a guide member located adjacent the side of the bucket for guiding selective movement of the shield member with respect to the mouth of the bucket.

1 Claim, 3 Drawing Sheets

PAINT ROLLER SPIN SPRAY SHIELD FOR BUCKETS

CROSS-REFERENCE TO RELATED APPLICATIONS

The present patent application is a divisional application of Ser. No. 08/559,193, filed on Nov. 13, 1995, which is pending.

BACKGROUND OF THE INVENTION

1. Field of the Invention

The present invention relates to buckets, particularly large buckets (on the order of 5 or 6 gallon size). More particularly, the present invention relates to a selectively raisable shield for a bucket which serves to retain roller spray within the confines of the bucket when a paint roller is being cleaned by spinning.

2. Description of the Related Art

One tool frequently used by painters is a paint roller tool. The rollers thereof become laden with paint during the painting process. Since the roller is not usually worn-out by a single usage, a painter must thoroughly clean the roller if it is desired to reuse the roller in the future. If the roller is not clean any remaining paint will harden, thereby matting at least a portion of the roller nap, could possibly contaminate the next used paint color, or may cause flecks of the dried paint in and on the roller to be left behind as unsightly specks on a surface being painted.

Rollers are able to hold a vast quantity of paint. One method of cleaning rollers relies upon centrifugal force to cause paint to be flung from a roller. Centrifugal cleaning involves spinning the roller at a very fast rate, whereupon the paint is caused to fly outwardly from the roller. In order to generate the rotation speed necessary for centrifugal cleaning to work well, a commercially available spinning tool is used to clean a roller. The commercially available spinning tool (which is depicted in FIG. 1) includes a barrel, a handle, a screw member connected with the handle and threadably engaged with respect to the barrel, and a roller holder which is bearingly engaged with the barrel opposite the handle and spinably connected with the screw member. When the handle is pushed in toward the barrel, the roller holder spins and continues spinning even after the handle has stopped moving, whereby the centrifugal force generated thereby causes a roller placed thereupon to become cleaned. Problematically, the centrifugal nature in which the paint drops leave the roller entails paint spraying everywhere. Accordingly, painters try carefully to place the roller as far inside their bucket as possible before spinning it with a commercial spinning tool, with less than perfect results. Inevitably, some paint flies centrifugally to a place where it shouldn't be (i.e., someplace outside the bucket).

Accordingly, what is needed is some way in which a bucket can serve to retain centrifugal paint spray when a roller is cleaned with a spinning tool, without detracting from its ability to function as a bucket for other purposes.

SUMMARY OF THE INVENTION

The present invention is a spin spray shield which is connected with a bucket to thereby assist the bucket to retain centrifugal paint spray when a roller is cleaned with a spinning tool, without detracting from the funtionality of the bucket for other purposes.

The spin spray shield according to the present invention generally includes an annular shield member for being selectively located above the mouth of a bucket to thereby serve as a shield for retaining spin generated paint spray within the confines of the interior of the bucket, and further includes a guide member located adjacent the side of the bucket for guiding selective movement of the shield member with respect to the mouth of the bucket.

In the preferred embodiment of the spin spray shield, the shield member is composed of a loop of sheet material (that is, a sheet material loop) dimensioned to nest within the interior of the bucket, the bucket being for example a five or six gallon size bucket. The shield member is raisable from a nested position within the bucket to a deployed position wherein the shield member extends from just below the mouth of the bucket to a selected location above the mouth, such as for example nine inches above a fourteen inch tall bucket to thereby render a roller mounted to a commercially available spin tool sufficiently shielded so that all the centrifugally originated paint spray therefrom collides with the shield member and the bucket inside wall and thereby staying within the confines of the bucket. The guide member includes a mast connected with the shield member and at least one guide which is directly or indirectly connected with the bucket. The at least one guide vertically guides sliding movement of the mast, whereby the shield member is guidably moved with respect to the mouth of the bucket. Preferably, the mast is removably mounted with respect to the at least one guide so that the shield member is selectively connected with the bucket.

Accordingly, it is an object of the present invention to provide a spin spray shield to thereby increase the height of the bucket so that spray from a roller spun inside the bucket will be entrapped within the bucket and the spin spray shield.

It is an additional object of the present invention to provide a spin spray shield for increasing the height of the bucket so that spray from a roller spun inside the bucket will be entrapped within the bucket and the spin spray shield, wherein the height of the spin spray shield relative to the mouth of the bucket is user selectable.

It is another object of the present invention to provide a spin spray shield for increasing the height of the bucket so that spray from a roller spun inside the bucket wi be entrapped within the bucket and the spin spray shield, wherein the height of the spin spray shield relative to the mouth of the bucket is user selectable, and wherein the spin spray shield is selectively removable from the bucket.

It is a further object of the present invention to provide an adjustable tensioning band for engirding an bucket to thereby mount one or more objects to the bucket by depending therefrom.

These, and additional objects, advantages, features and benefits of the present invention will become apparent from the following specification.

DETAILED DESCRIPTION OF THE PREFERRED EMBODIMENT

Figure 1:
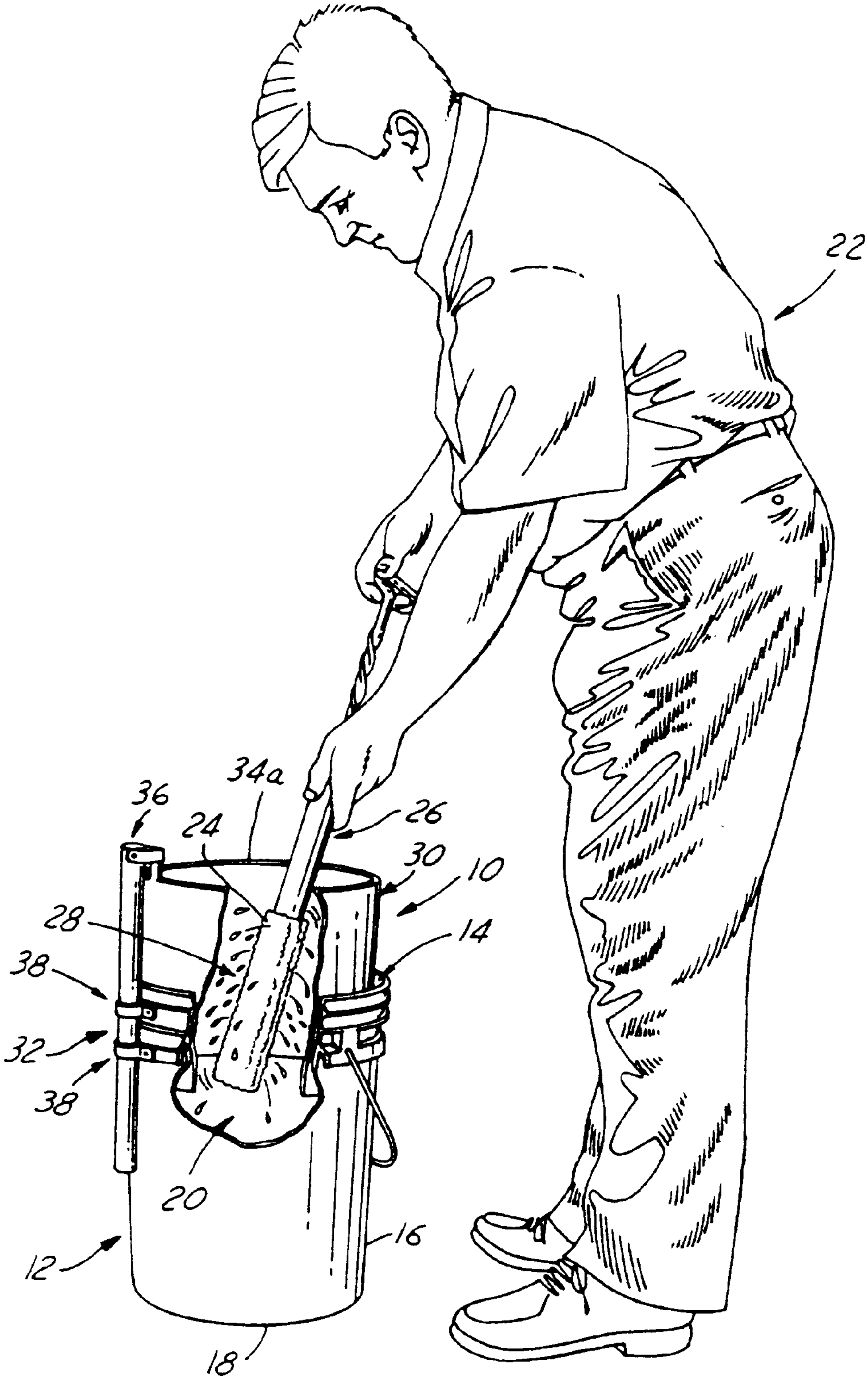
FIG. 1 is a perspective view of the spin spray shield according to the present invention, shown in operation in connection with a bucket.
Figure 2:
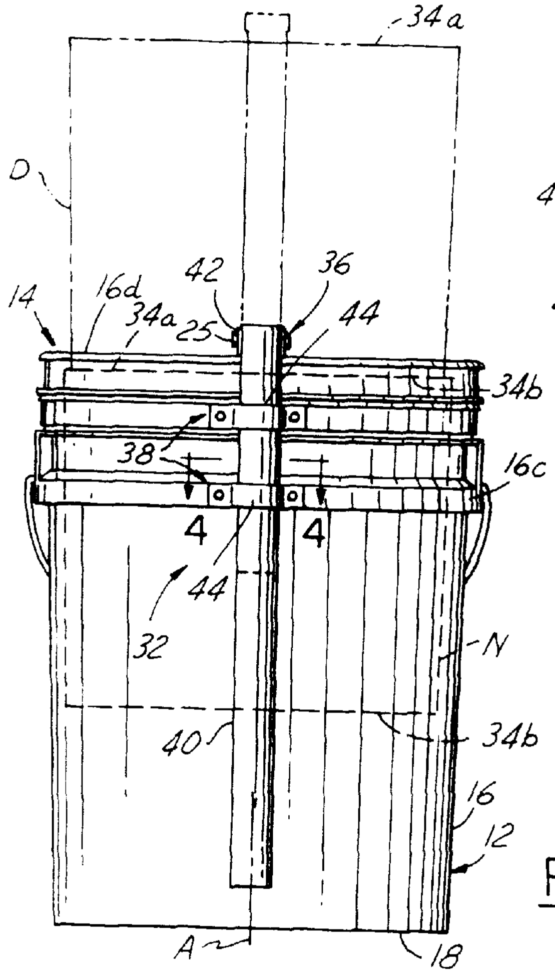
FIG. 2 is a side elevational view of the spin spray shield according to the present invention, shown installed with respect to a bucket.
Figure 3:
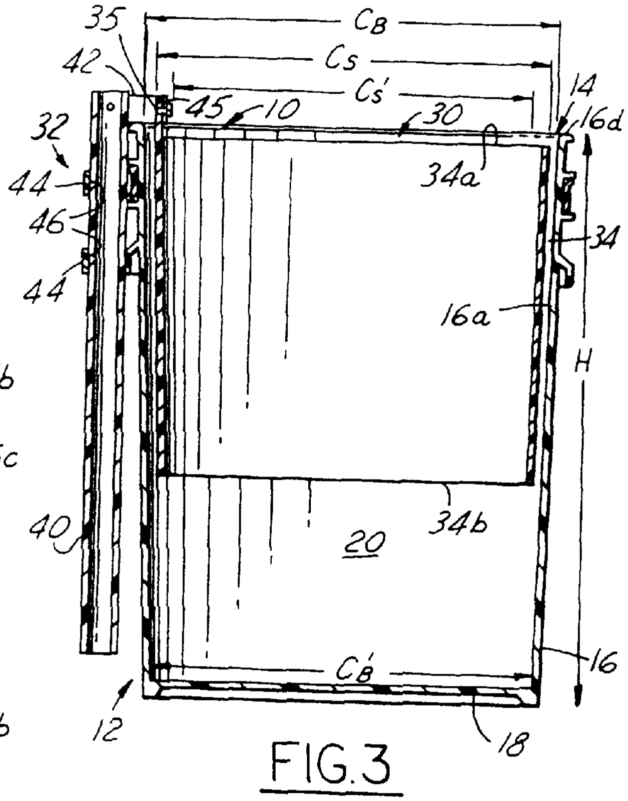
FIG. 3 is a partly sectional side view of the spin spray shield according to the present invention, shown installed with respect to a bucket.

Referring now to the Drawing, FIG. 1 generally depicts the spin spray shield 10 according to the present invention in a typical environment of use. The spin spray shield 10 is connected with a bucket 12, such as for example a five or six gallon (or some other chosen) size commercially obtainable bucket. The bucket 12 has a mouth 14, a sidewall 16 (the lip 16*d* of the sidewall defining the mouth) and a bottom 18 which collectively define an interior space 20 of the bucket. The mouth 14 is generally annular and has a given cross-section $C_B$ at the mouth (see FIG. 3), and the sidewall 16 has a height H (see FIG. 3) which renders an inherent tallness to the bucket. As can be discerned from FIG. 1, the sidewall 16 of the bucket 12 has a taper so that the cross-section $C_B$ at the mouth is larger than the cross-section $C_B'$ at the bottom 18 (see FIG. 3). The spin spray shield 10 is structured to cooperate with the bucket to be deployable at the mouth 14 so that when a painter 22 spins a roller 24 of a conventional paint roller tool via a commercial spin tool 26 with the roller located in and about the interior space 20 of the bucket, the paint spray 28 centrifugally leaving the roller will be retained within the confines of the bucket and the spin spray shield. As generally shown in FIG. 1, the spin spray shield 10 includes two major components: a shield member 30 dimensioned to interface with the interior side 16*a* of the sidewall 16 of the bucket 12 to confine centrifugal roller spray therewithin and a guide member 32 for guiding positioning of the spin spray shield with respect to the mouth 14 of the bucket.

The structure and function of the spin spray shield 10 will now be detailed with greater specificity with reference now being additionally directed to to remaining FIGS. 2 through 11.

The shield member 30 is in the form of a cylindrically shaped sheet material loop 34 for being located adjacent the interior side 16*a* of the sidewall 16 of a bucket 12 at the mouth 14 thereof. If a bucket has a mouth shape other than circular, the shape of the sheet material loop 34 would be correspondingly shaped to adjacently fit therein. A preferred material for the sheet material loop 34 is a plastic. The selected plastic and the thickness thereof is chosen so that the shape of the sheet material loop is self-supporting when in the deployed position. A preferable plastic for the sheet material loop 34 is one that paint does not well stick to, so that any paint spray thereon is reasonably easy to clean off. The sheet material loop 34 is preferably constructed of a continuous loop of sheet material; however, it is possible to construct the sheet material loop from a length of flat sheet material that has been rolled and the abutting ends thereof fastened together by any suitable interconnection means to thereby form a loop thereof, such as for example glue, a bracket having opposing U-shaped portions for receiving the ends, or fasteners, such as for example rivets.

As mentioned, conventional buckets are usually tapered. Accordingly, it is preferred to configure the sheet material loop into a taper similar to that of a bucket, wherein the cross-section $C_S$ at the top edge 34*a* is greater than the cross-section $C_S'$ at the bottom edge 34*b*.

As mentioned, the purpose of the shield member 30 is to provide an extension of a bucket above its mouth to thereby effectively increase the height of the bucket sidewall so as to receive centrifugal roller spray when using a commercial spin tool within the bucket. Accordingly, when at the shield member 30 is at the deployed position, the top edge 34*a* and the bottom edge 34*b* of the sheet material loop 34 are spaced apart a predetermined distance to provide enough height to the bucket to provide this feature (see FIG. 1 in combination with the phantom lines D in FIG. 2). In this regard as shown in phantom in FIG. 2, the bottom edge 34*b* is typically located a short distance below the mouth 14 of the bucket 12, whereby any flying spray produced by centrifuging a roller would caught by either the inside 16*a* of the sidewall 16 or the sheet material loop 34, and any paint oozing down the sheet material loop will thereupon drip into the interior space 20 of the bucket.

It is preferred for the sheet material loop 34 of the shield member 30 to be of sufficient cross-section as to be adjacent the sidewall 16 at the mouth 14. In this regard, the taper of the sidewall 16 is to be taken into account so that the sheet material loop 34 is able to nest into the sidewall, as depicted by phantom lines N in FIG. 2. Further in this regard, when the shield member 30 is in the nested position, having the sheet material loop 34 close the the sidewall 16 of the bucket 12 provides for the interior space 20 of the bucket to be essentially usingly unimpaired by the presence of the shield member, so that articles, water, etc. are situatable within the bucket in a normal manner.

As mentioned, the shield member 30 is selectively positionable with respect to the mouth 14 of the bucket 12. This is accomplished by the aforementioned guide member 32. The guide member 32 includes a first component 36 which is connected with the shield member 30 and a second component 38 connected (directly or indirectly) with the sidewall of the bucket 12. The first and second components 36, 38 slidably interact to thereby guide movement of the shield member 30 with respect to the mouth 14 of the bucket 12 in the bucket axis A (see FIG. 2), wherein the bucket axis is oriented perpendicular to the plane of the lip 16*d* of the sidewall 16.

There are two preferred forms of the first and second components, as will be detailed below, wherein the first preferred form of the first and second components are depicted by FIGS. 1 through 6, and the second preferred form of the first and second components are depicted by FIGS. 7 through 11.

The first preferred form of first component 36 is a rigid mast 40, such as for example a section of plastic conduit. The mast 40 is connected with the sheet material loop 34 adjacent the top edge 34*a* thereof via a bracket 42. The preferred bracket 42 is U-shaped, wherein the clevis thereof is connected to the mast 40 near the top thereof by a threaded fastener 25 and a base of the clevis is connected to the sheet material loop 34 by a threaded fastener 35 (of course, other fastening means may be used other than threaded fasteners). Other connection methodologies may be used in place of the bracket, such as for example a pedestal integrally formed with the mast and glued to the sheet material loop. In order for the shield member 30 to nest within the bucket 12, it is preferred for the sheet material loop 34 to include a tongue 45 projecting in the local plane of the sheet material loop at the top edge 34*a* thereof to which the bracket 42 attaches by an attachment means, such as for example by the threaded fastener 35. The length of the mast 40 is selected to extend preferably about the height H of the bucket 12 for the purpose of providing movement of the shield member 30 between its deployed position D and its nested position N.

Figure 4:
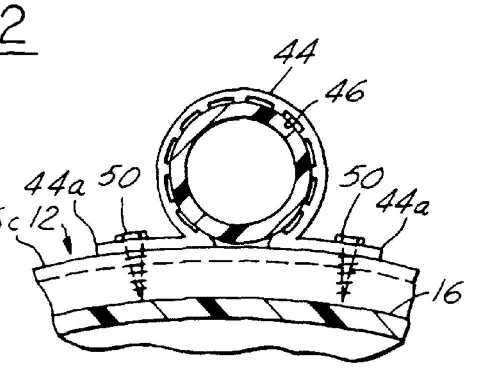
FIG. 4 is a partly sectional detail view along line 4—4 in FIG. 1, showing the interconnection of the guide member of the spin spray shield according to the present invention with a bucket.

The first preferred form of the second component 38 includes two mutually separated guides 44 connected with the bucket 12. Each of the guides 44 has a guide hole 46 which is dimensioned to snugly and slidably receive the mast 40, wherein the guide hole may be fluted (as shown in FIG. 4) to provide guidance with minimal contact friction with respect to sliding of the mast. The connection of the guides 44 to the sidewall 16 of the bucket 12 may be indirect via a band 48 that engirds the sidewall, or direct via threaded fasteners 50 engaging the sidewall. While two guides 44 are preferred, at least one guide 44 is required; more than two guides or a single elongated guide (of a pipe-like configuration) could be utilized.

Figure 5:
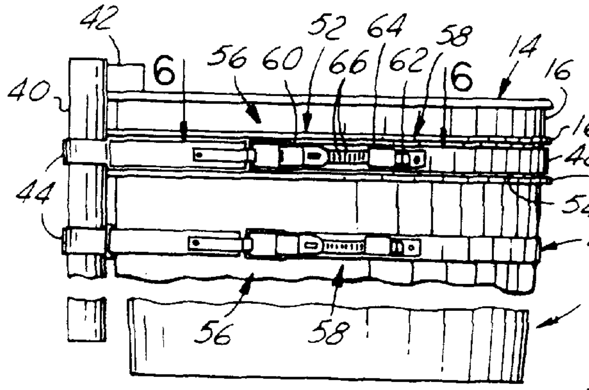
FIG. 5 is a partly broken-away side elevational view of the spin spray shield according to the present invention, shown installed on a bucket and particularly detailing the guide member of the spin spray shield.
Figure 6:
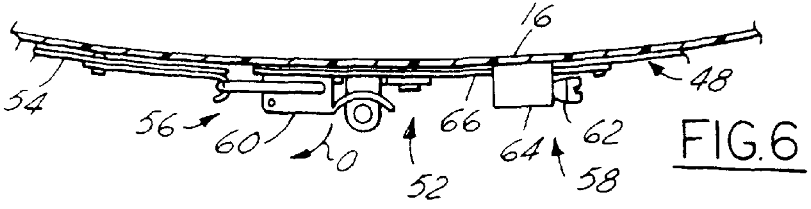
FIG. 6 is a partly sectional, detail top plan view of the spin spray shield according to the present invention and bucket, seen along lines 6—6 in FIG. 5.
Figure 7:
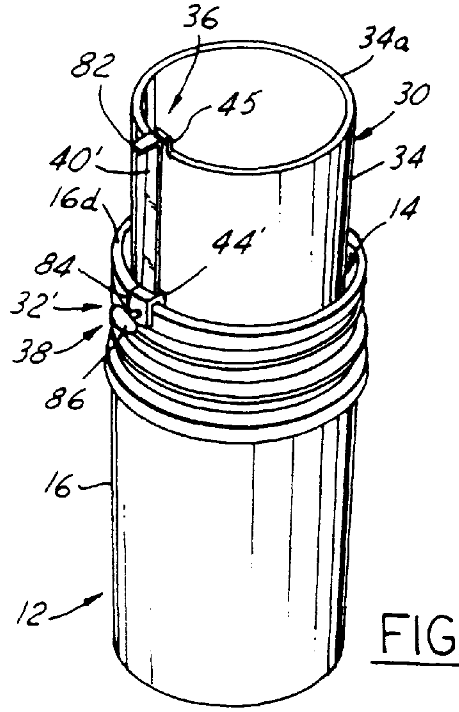
FIG. 7 is a perspective view of the spin spray shield according to the present invention installed with respect to a bucket, wherein an alternate form of guide member is utilized.
Figure 8:
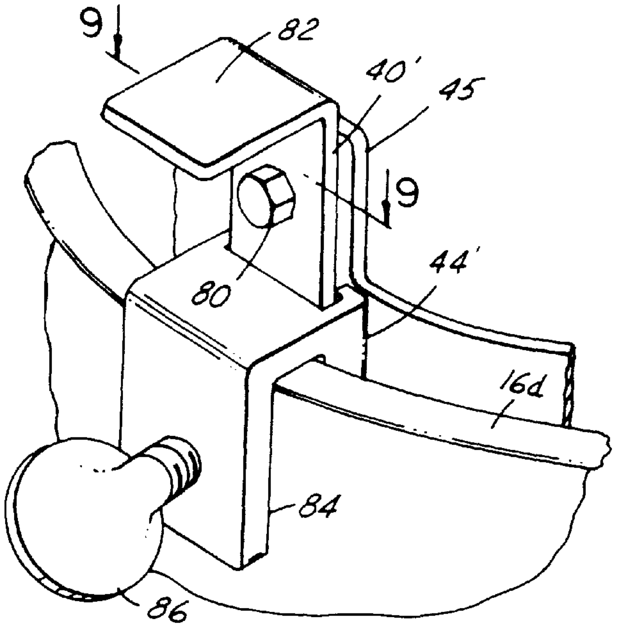
FIG. 8 is a detail perspective view showing operation of the alternate form of guide member.
Figure 9:
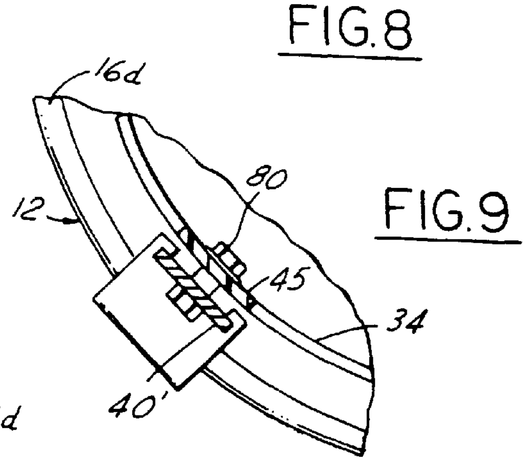
FIG. 9 is a side view along 9—9 in FIG. 8, showing the structural feature for providing mutually sliding, guided movement of the spin spray shield relative to the bucket.
Figure 11:
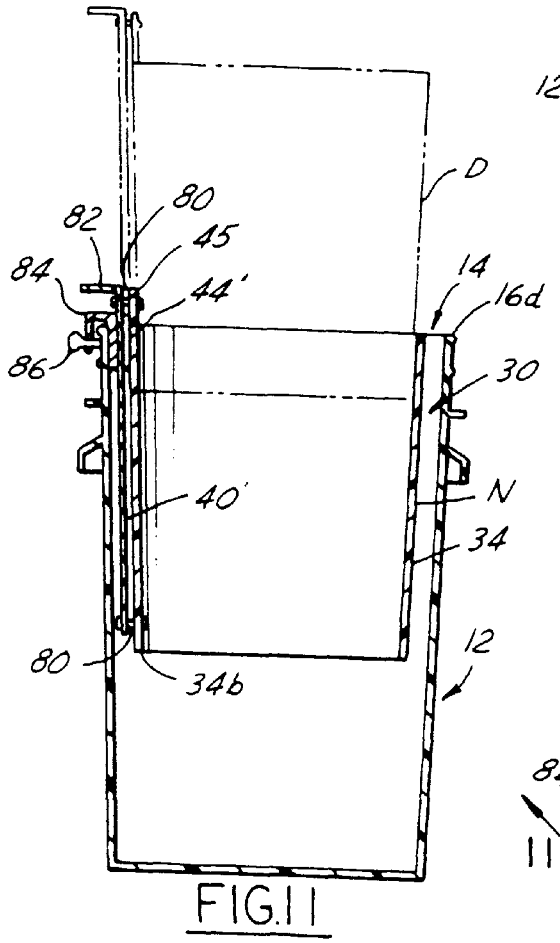
FIG. 11 is a sectional view of the spin spray shield according to the present invention installed with respect to a bucket, wherein the alternate form of guide member is shown.
Figure 10:
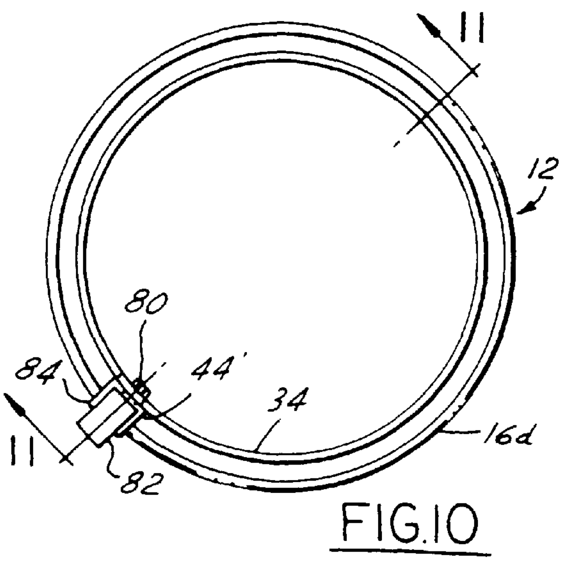
FIG. 10 is a top plan view of the spin spray shield according to the present invention installed with respect to a bucket, wherein the alternate form of guide member is shown.

In the case of connection of a guide 44 via a band 48, the guide may be integrally formed with the band or be connected thereto via feet thereof (see FIG. 4) such as by an adhesive or by threaded fasteners. In order for the band 48 to tightly engird the sidewall 16, a connector 52 is included therewith. The connector 52 is structured to allow a user to install the band 48 engirdingly about the sidewall 16 and then tightly encircle the sidewall so that the band is held firmly thereto under its own tension. In this regard, the band 48 is composed of a band member 54, which may be for example plastic or metallic, which is connected with the connector 52. A preferred connector 52 is depicted in FIGS. 5 and 6. The connector 52 includes a buckle component 56 and an adjustment component 58. The buckle component 56 operates on a conventional buckle principle, wherein an off-set pair of pivots causes the cross-section of the band 48 to contract as the buckle 60 is closed and causes the cross-section of the band to expand as the buckle is opened (along arrow O in FIG. 6). The adjustment component 58 is connected with the buckle component and operates similarly to that of a screw and serrations operated hose clamp. In this regard, the buckle component 56 is connected with one end of the band member 54 the adjustment component 58 is composed of a serrated strip 66 having a series of serially disposed serrations, which is connected to the buckle 60, and a screw 62 connected with a seat 64 to the other end of the band member, wherein the screw is threadably engaged with the serrations of the serrated strip. Turning of the screw 62 in its seat 64 causes the serrations of the serrated strip 66 to threadingly move with respect to the seat and thereby adjust the cross-section of the band 48. Accordingly, with the cross-section of the band 48 adjusted by the adjustment component 58, closure of the buckle 60 effects a tensioned, tight and secure fit of the band 48 with respect to the sidewall 16. In this regard, the band 48 may be placed between sidewall ribs 16*c'* of the bucket 12 (if they are present), or elsewhere on the sidewall (either case being depicted in FIG. 5).

In the case of connection of a guide 44 directly to the sidewall 16, as shown in FIG. 4, it is preferred for the guide to be threadably connected with a sidewall flange 16*c* whereby the threaded fasteners 50 engage feet 44*a* of the guide. In this manner, the threaded fasteners 50 will not pierce the sidewall 16. Alternatively, the feet 44*a* can be adhered to the sidewall by an adhesive, but this is not preferred if this form of installation results in a permanent connection (however, if the bucket is to be permanently altered, then there would be no objection). Further with regard to feet 44*a*, spacers can be employed between the feet and the sidewall (or the feet and the band member 54) in order to properly align the locations of the guide hole 46 of each of the guides 44 with respect to to the bucket axis A.

It should be noted that the mast 40 is slidable along the guide holes 46 and may be disengaged therefrom by sliding entirely thereout, whereupon the shield member 30 is disconnected from the bucket 12. Alternatively, it is possible to place a stop nib or other stop mechanism on the mast to prevent removal from the guides.

It should further be noted that the band 48 may be attached to a bucket independently of the guides for the purposes of suspending any other object therefrom alongside the sidewall of the bucket, such as for example a tool holder of some sort that lippingly engages the band.

In order to exemplify the criteria underwhich the present invention is effectable with respect to a bucket and a spin tool, an example will now be detailed. The bucket is a five gallon size, having a height H of about 15 inches, a cross-section $C_B$ at the mouth of about 11.25 inches and a cross-section $C_B'$ at the bottom of about 10 inches. The spin tool has a barrel about 8 inches long, the screw member on the handle is extendable about 7 inches from the barrel and the roller holder thereof holds a paint roller typically between about 9 and 12 inches in length. A spin spray shield 10 therefor could be, by way of example only, dimensioned as follows. The sheet material loop 34 is plastic having a thickness of about ⅛ inch, a width measured between the top edge 34*a* and bottom edge 34*b* of about 9 inches, and a cross-section $C_S$ of about 10.5 inches at the bottom edge and a cross-section $C_S'$ of about 11 inches at the top edge. The tongue 45 extends about 1 inch from the top edge. The mast 40 is a plastic conduit section of 1 inch outside diameter and length of about 15 inches. The guides 44 are separated from each other along the direction of the bucket axis A by about 4 inches, wherein the band member has a width of about 0.5 inch and the guides provide a guide hole 46 that extends about 0.6 inch along the bucket axis. Finally, the bracket 42 has a base separated from the mast by about 0.7 inch. It is to be noted that for the sheet material loop to have an appropriate spray shield function as disclosed generally herein, that its width should preferably be about 4 inches at the minimum.

The second preferred form of first component 36 is a rigid mast 40', such as for example a section of corrosion resistant strap (such as a strap of galvanized steel, aluminum or strong plastic). The mast 40' is connected with the sheet material loop 34 adjacent the bottom edge 34*b* thereof and at the tongue 45 via a threaded fastener 80 at each location (of course, other fastening means may be used other than a threaded fastener). To facilitate uplifting the shield member

30, a tab 82 may be provided at the uppermost end of the mast 40'. The length of the mast 40' is selected to extend preferably about the height H of the bucket 12 for the purpose of providing movement of the shield member 30 between its deployed position D and its nested position N.

The second preferred form of the second component 38 includes a guide 44' connected with the bucket 12 via a clamp 84. Preferably the clamp 84 and the guide 44' are an integral single piece. The clamp 84 includes a tightening screw 86, preferably a wing-head bolt. The guide 44' has a guide hole 46' in the form of a slot which is dimensioned to snugly and slidably receive the mast 40'. The guide 44' is connected, via the clamp 84, to the sidewall 16 at the lip 16*d* thereof.

It will be noted that the guide 44' is located between the threaded fasteners 80, thereby serving to define maximum travel limits of the sheet material loop 30 relative to the bucket 12. However, in the event the threaded fastener 80 at the bottom edge 34*b* is not provided, then the mast 40' is fully removable from the guide 44' and the sheet material loop is thereby then also removable from the bucket.

The advantage of the second form of first and second components 36, 38 is that the external side of the sidewall 16 of the bucket 12 is free of the mast (which is now internal to the bucket).

In operation, the user installs the one or more guides to a selected bucket using fasteners or an engirding band. The mast is placed through each guide hole of the one or more guides. If not already connected, the mast is connected to the sheet material loop. The user then presses upon the shield member to cause the mast to move along the one or more guides to thereby move the sheet material loop into the nested position. When one or more paint rollers are to be cleaned, the user then grabs and pulls upon the mast, for example at the bracket or the tab, to cause the sheet material loop to be raised to the deployed position. At the deployed position, the user then places a spinning tool into the interior space of the bucket and commences spinning of a paint roller to be centrifugally cleaned, whereupon the splatter flies to the sides of the sidewall and the sheet material loop and does not leave the confines of the bucket.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A band for tensionally engirding the sidewall of a bucket, said band comprising:

a band member; and a connection member connected to said band member, said connection member comprising:

buckle means for providing selectively tensioned tightening of said band engirdingly about a selected sidewall; and adjustment means for providing cross-sectional adjustment of said band;

wherein said band member has a first end an a second end, wherein said buckle means is connected with said first end of said band member; and wherein said adjustment means comprises:

a serrated strip having a series of serially disposed serrations, said serrated strip being connected to said buckle; and screw means connected with said second end of said band member for threadingly engaging said serrations to thereby provide said cross-sectional adjustment.

* * * * *